US009261426B2

(12) United States Patent  
Penza et al.

(10) Patent No.: US 9,261,426 B2  
(45) Date of Patent: Feb. 16, 2016

(54) SYSTEM AND METHOD FOR AUTOMATED INTEGRITY TESTING

(71) Applicant: ULC ROBOTICS, INC., Bayshore, NY (US)

(72) Inventors: G. Gregory Penza, Old Field, NY (US); Ryan McGowan, Lindenhurst, NY (US); Robert E. Kodadek, III, Long Beach, NY (US)

(73) Assignee: ULC Robotics, Inc., Hauppauge, NY (US)

( * ) Notice: Subject to any disclaimer, the term of this patent is extended or adjusted under 35 U.S.C. 154(b) by 355 days.

(21) Appl. No.: 13/847,050

(22) Filed: Mar. 19, 2013

(65) Prior Publication Data  
US 2013/0239662 A1 Sep. 19, 2013

Related U.S. Application Data

(60) Provisional application No. 61/612,633, filed on Mar. 19, 2012.

(51) Int. Cl.  
G01M 3/26 (2006.01)  
G01M 3/28 (2006.01)

(52) U.S. Cl.  
CPC .................... *G01M 3/2815* (2013.01)

(58) Field of Classification Search  
CPC ....... G01M 3/04; G01M 3/26; G01M 3/2815; G01M 3/243; G01M 3/2807; H01M 3/18; F16L 2201/30  
USPC .................. 73/40, 40.5 R, 40.5 A, 49.1, 49.5  
See application file for complete search history.

(56) References Cited

U.S. PATENT DOCUMENTS

| 5,866,802 | A | 2/1999 | Kimata et al. |
| 5,908,980 | A | 6/1999 | Hwang et al. |
| 6,070,453 | A * | 6/2000 | Myers ........................ 73/40.5 R |
| 7,886,579 | B2 * | 2/2011 | Zinth ....................... G01N 1/14 141/130 |
| 2003/0060721 | A1 * | 3/2003 | Nakazawa et al. ............. 600/490 |
| 2005/0011252 | A1 * | 1/2005 | Arima et al. ............... 73/40.5 R |
| 2005/0247110 | A1 * | 11/2005 | Sagi et al. ......................... 73/40 |

(Continued)

FOREIGN PATENT DOCUMENTS

| DE | 102012103421 A1 | 10/2012 |
| EP | 1666864 A1 | 7/2006 |
| GB | 1426556 | 3/1976 |

(Continued)

OTHER PUBLICATIONS

Search Report for Application No. GB1304975.4 dated Aug. 5, 2013.

*Primary Examiner* — Peter Macchiarolo  
*Assistant Examiner* — Anthony W Megna Fuentes  
(74) *Attorney, Agent, or Firm* — Brooks Kushman P.C.

(57) ABSTRACT

A testing system and method for performing integrity testing in a gas piping system include using a motorized pump to pressurize the piping system. A pressure sensor is used for measuring the pressure in the piping system, and an input device receives inputs from an operator related to a test to be performed. An output device is provided for communicating information to the operator. A control system includes at least one controller and is configured to: control the pump to pressurize the piping system to a predetermined pressure, receive inputs from the pressure sensor, and output data related to the pressure of the piping system.

14 Claims, 2 Drawing Sheets

(56) References Cited

U.S. PATENT DOCUMENTS

| | | |
|---|---|---|
| 2006/0191323 A1 | 8/2006 | Garabedian et al. |
| 2007/0181192 A1* | 8/2007 | Choi et al. .................... 137/551 |
| 2009/0157003 A1* | 6/2009 | Jones ................ A61M 5/16859 604/131 |
| 2010/0043534 A1* | 2/2010 | Sleijpen et al. .................... 73/40 |
| 2011/0046903 A1 | 2/2011 | Franklin |
| 2011/0178736 A1 | 7/2011 | Westra et al. |

FOREIGN PATENT DOCUMENTS

| | | |
|---|---|---|
| JP | 2002148138 A | 5/2002 |
| WO | 9967615 A1 | 12/1999 |
| WO | 2010098671 A1 | 9/2010 |
| WO | 2012134247 A2 | 10/2012 |

* cited by examiner

SYSTEM AND METHOD FOR AUTOMATED INTEGRITY TESTING

CROSS-REFERENCE TO RELATED APPLICATIONS

This application claims the benefit of U.S. provisional application No. 61/612,633 filed 19 Mar. 2012, which is hereby incorporated herein by reference.

TECHNICAL FIELD

The present invention relates to a system and method for automated integrity testing.

BACKGROUND

Often, during the course of routine maintenance, gas meter exchanges—both standard and automated meter reading (AMR) meters—gas conversions, system upgrades, installation and testing of service pipes, and during emergencies, natural gas supplied to a commercial building or residence must be shut off. Once the work is performed, gas may be restored to the premises, or at a minimum, gas is restored between the service and the gas main. Prior to introducing gas to the end use equipment and/or in-house or service piping, an integrity test of the piping may be required.

Integrity tests help provide a level of confidence that the piping, fittings and couplings in the system are capable of maintaining the pressure that will be generated and sustained during normal gas usage, prior to re-energizing the pipe with gas. A large number of integrity tests are performed by utility companies and their contractors each day and are integral in ensuring that the safety of residences, businesses and technicians is maintained.

An integrity test helps to detect leaks and breaches in pipe, fittings, and connections to end use equipment, and helps to provide a level of confidence that the work performed on the piping was completed satisfactorily as to not allow a gas leak once reinstated. After updating, upgrading or repairing the gas piping, gas meter or end use equipment in a building, the following general procedure may be used to perform an integrity test.

A combination of devices and tubes, commonly known as a "Christmas Tree", consisting of an aspirator ball on a valve, a tee, a manifold and a manometer, is connected to the service pipe before the meter set and air is pumped by hand into the piping to generate pressure of six to eight inches of water column inside the piping. Depending on the size of the building and the size of the piping, the time required to pump the service piping up to the required pressure by hand can be 30 minutes or more. The mechanic performing the integrity test watches the manometer for a predetermined time period. If the pressure remains constant throughout the test, the integrity of the piping and connections is confirmed. The mechanic fills out a report by hand that establishes pertinent information relative to the test that was performed (time, date, location, mechanic name, test results, etc.).

Because this process is performed by many different mechanics, it is difficult, if not impossible, to obtain consistent results or to ensure that the proper procedure is followed each time. Additionally, errors made during the report generation stage, due to illegible hand writing, misspellings, accidental typographical errors, etc., can cause the results provided to the gas distribution company to be flawed.

Therefore, a system and method for automating the integrity test process that can reduce the potential for human error would be beneficial because it would reduce risk, minimize the time required to perform testing, generate an accurate reporting trail and provide technicians a tool to use in their daily work.

SUMMARY

Embodiments of the invention provide an at least partially automated system and method for performing integrity tests consistently, and accurately reporting issues and test results electronically. The piping may be pressurized, for example, with a motorized pneumatic pump to speed-up the process and to help ensure reproducible test procedures. An input device can be employed to manually input testing parameters, or such parameters can be pre-entered or uploaded into the system by wired or wireless computerized means. A visual display can provide input options to a mechanic, it can provide information, including step-by-step procedures to follow, and it can visually output the results. Audio and/or haptic indicators can also be used to alert or otherwise notify the mechanic of action to be taken. Once the pump brings the piping up to pressure, the pressure can be monitored and recorded for the desired time period, and any pressure drops can be flagged. Embodiments of the invention may include one or more outputs, which may be, for example, in the form of a printed report, an upload to a database or an electronically communicated report.

At least some embodiments of the invention include a testing system for performing integrity testing in a gas piping system. The testing system includes a motorized pump for pressurizing the piping system, a pressure sensor for measuring the pressure in the piping system, an input device for receiving inputs from an operator related to a test to be performed, and an output device for communicating information to the operator. The testing system further includes a control system including at least one controller and configured to: control the pump to pressurize the piping system to a predetermined pressure, receive inputs from the pressure sensor, and output data related to the pressure of the piping system.

At least some embodiments of the invention include a testing system for performing integrity testing in a gas piping system. The testing system includes a motorized pump for pressurizing the piping system, a pressure sensor for measuring the pressure in the piping system, and a control system including at least one controller. The control system is configured to: control the pump to pressurize the piping system to a predetermined pressure, receive inputs from the pressure sensor, and output data related to the pressure of the piping system over a predetermined time.

At least some embodiments of the invention include a method for performing integrity testing in a gas piping system. The method includes inputting into a programmable testing system data related to a test to be performed, and pressurizing the piping system to a predetermined pressure using a motorized pump making up a part of the testing system. The method further includes using a pressure sensor providing outputs to a control system of the testing system to monitor the pressure of the piping system after the piping system is pressurized to the predetermined pressure and outputting data related to the pressure of the piping system from the control system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
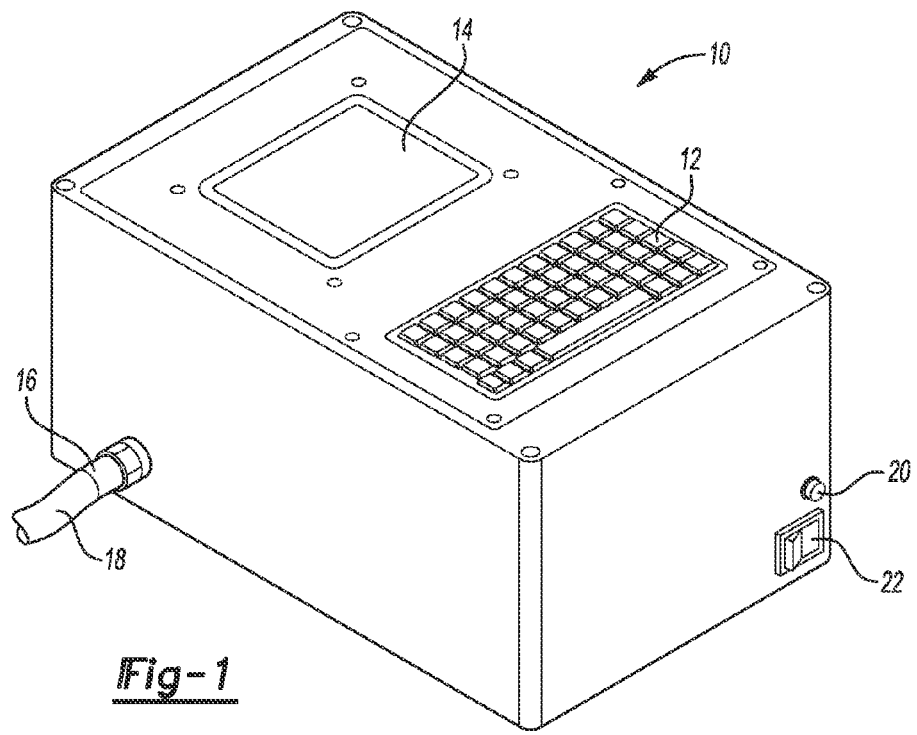
FIG. 1 is a perspective view of a testing system in accordance with an embodiment of the present invention.

FIG. 1 shows a testing system 10 in accordance with an embodiment of the present invention. The testing system 10 is small enough to be handheld and easily portable to locations in the field. The testing system 10 includes an input device 12, shown in this embodiment as a keyboard. Other types of input devices are contemplated, such as styli, microphones, etc. The keyboard 12 is configured to receive input from a mechanic, technician, or other operator performing the integrity test. An operator can input any number of different parameters for data related to the test to be performed. For example, the street address of the building where the piping system is being tested, time and date information, the name of the mechanic performing the test, and other information relevant to the testing performed. Alternatively, all necessary or desirable information relating to the testing may be automatically input via signals received by a control system within the testing system 10, or preprogrammed into the testing system 10 before it is taken in the field.

The testing system 10 also includes an output device 14, shown in this embodiment as a LCD display. Other types of output devices are contemplated, for example, more limited visual or audio indicators such as lights or audible alarms, or even haptic output systems such as vibration generators. The testing system 10 also includes a fitting 16 configured to connect to tubing 18, which itself will be connected to the piping system being tested. The tubing 18 may be a part of the testing system 10 and may be terminated in any number of fittings appropriate to connect to the piping system being tested. Also shown on the testing system 10 is a connector 20 for receiving a cord connected to a power supply, and an on-off switch 22. The testing system 10 may be powered from an external source, such as contemplated in the embodiment shown in FIG. 1, or it may have a self-contained power supply, such as a battery.

Figure 2:
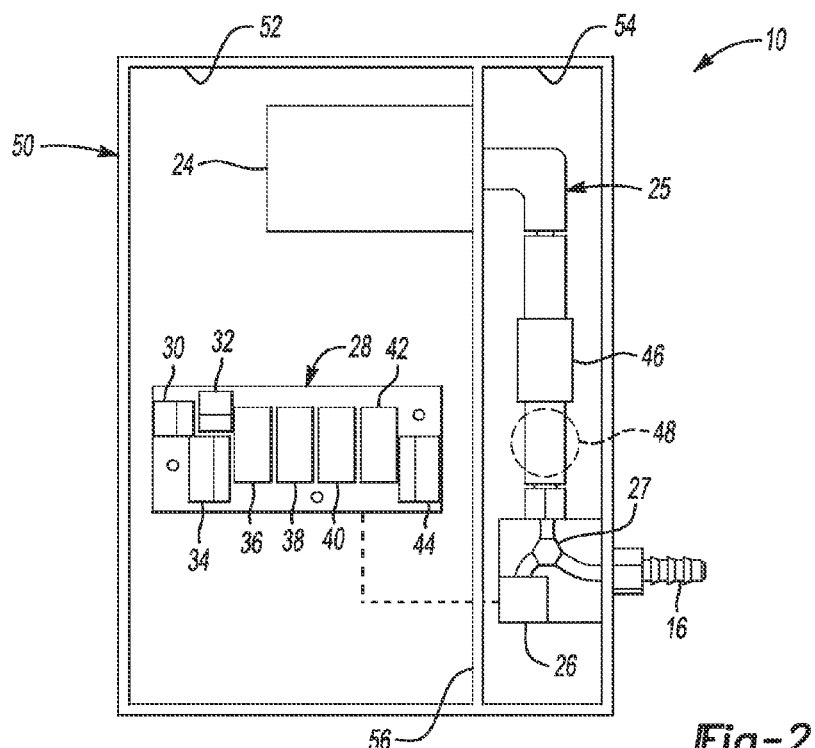
FIG. 2 is a top plan view of the testing system shown in FIG. 1 with a portion of the housing vote.

FIG. 2 shows a top plan view of the testing system 10 with a top portion removed and some of the components schematically illustrated therein. A motorized pump 24 is operable to pressurize the piping system being tested, and its output is sent through a conduit system 25, to the fitting 16, and ultimately to the piping system. The pump 24 is a pneumatic pump operable to pump air into the piping system; however, other fluids may be pumped into the piping system to perform testing, for example, nitrogen or other fluids. A pressure sensor 26 is fluidly connected to conduit system 25 and the fitting 16 via a "Y" connector 27, and it is operable to measure the pressure in the piping system. The "Y" connector 27 allows air to flow from the pump 24, out the fitting 16 to the piping system, bypassing the pressure sensor 26, but also connects the pressure sensor 26 to the piping system to facilitate pressure measurements.

The pressure sensor 26 is connected to a control system 28, which in the embodiment shown in FIG. 2 is a printed circuit board having components 30-44 disposed thereon. The components 30-44 may include any number of microprocessors (controllers), clocks/timers, wireless transmitters or receivers, etc. A check valve 46 is disposed between the pump 24 and the fitting 16 to prevent fluid flow—e.g., gas and/or air—from flowing back from the piping system to the pump 24. One or more additional check valves may be used within a system, such as the system 10 to provide additional assurance that gas will not flow back into the device.

The dashed line 48 in FIG. 2, represents any number of different components that may be present in various embodiments of the invention. For example, a flow meter, an oxygen monitor, a gas detector, a carbon dioxide detector, or other sensors or components desirable for receiving, processing or outputting information related to the testing being performed may be present in different embodiments. It is understood that such devices need not be located between the pressure sensor 26 and the check valve 48, but rather, could be located in other parts of the testing system. Using a flow meter as an example, the flow meter 48 is in communication with the control system 28 for measuring the volumetric flow of fluid leaking from the piping system. As noted above, the components of the control system 28 may include one or more clocks/timers, which can be used in conjunction with the pressure sensor 26 or the flow meter 48, so that the pressure or volumetric flow is measured over a predetermined time.

The testing system 10 also includes a housing 50 having the pump 24 and the control system 28 disposed therein. Specifically, the pump 24 and the control system 28 are disposed within a first chamber 52 of the housing 50. A second chamber 54 houses the pressure sensor 26, check valve 46, and, if present, flow meter 48. A sealed wall 56 separates the first and second chambers 52, 54. Specifically, the wall 56 is a full-height wall that is sealed against the top and bottom of the housing 50. For example, the wall 56 may be integrally molded with a bottom portion of the housing 50, and may be configured to seal with a top portion of the housing 50 when it is fully assembled. In the embodiment shown in FIG. 2, the sensor 26 is connected to the control system 28 through the wall 56. In other embodiments, a housing of the testing system may include a single chamber and at least some of the components—e.g., the "Y" connector 27 and the pressure sensor 26—may be located outside the housing. In such a case, the connections between the components outside the housing 50 and the control system 28 can be made through one of the outside walls of the housing, and any wires or other connectors can be sealed with an appropriate material—e.g., a polymeric potting material.

In general, the two chambers 52, 54 separate the electrical components, such as the pump 24 and the control system 28, from the conduit system 25, which is in fluid communication with the piping and potentially natural gas. This helps to ensure that the testing system 10 is "intrinsically safe", which is a term of art used in the industry to indicate certain design criteria for devices used in potentially hazardous situations. For example, in order for a measuring instrument to meet the specifications of intrinsic safety, components that exceed certain voltage and current levels are not permitted to be in the hazardous area. In general, a device that is termed "intrinsically safe" is designed to not contain any components that produce sparks or which could hold enough energy to produce a spark of sufficient energy to cause ignition.

Figure 3:
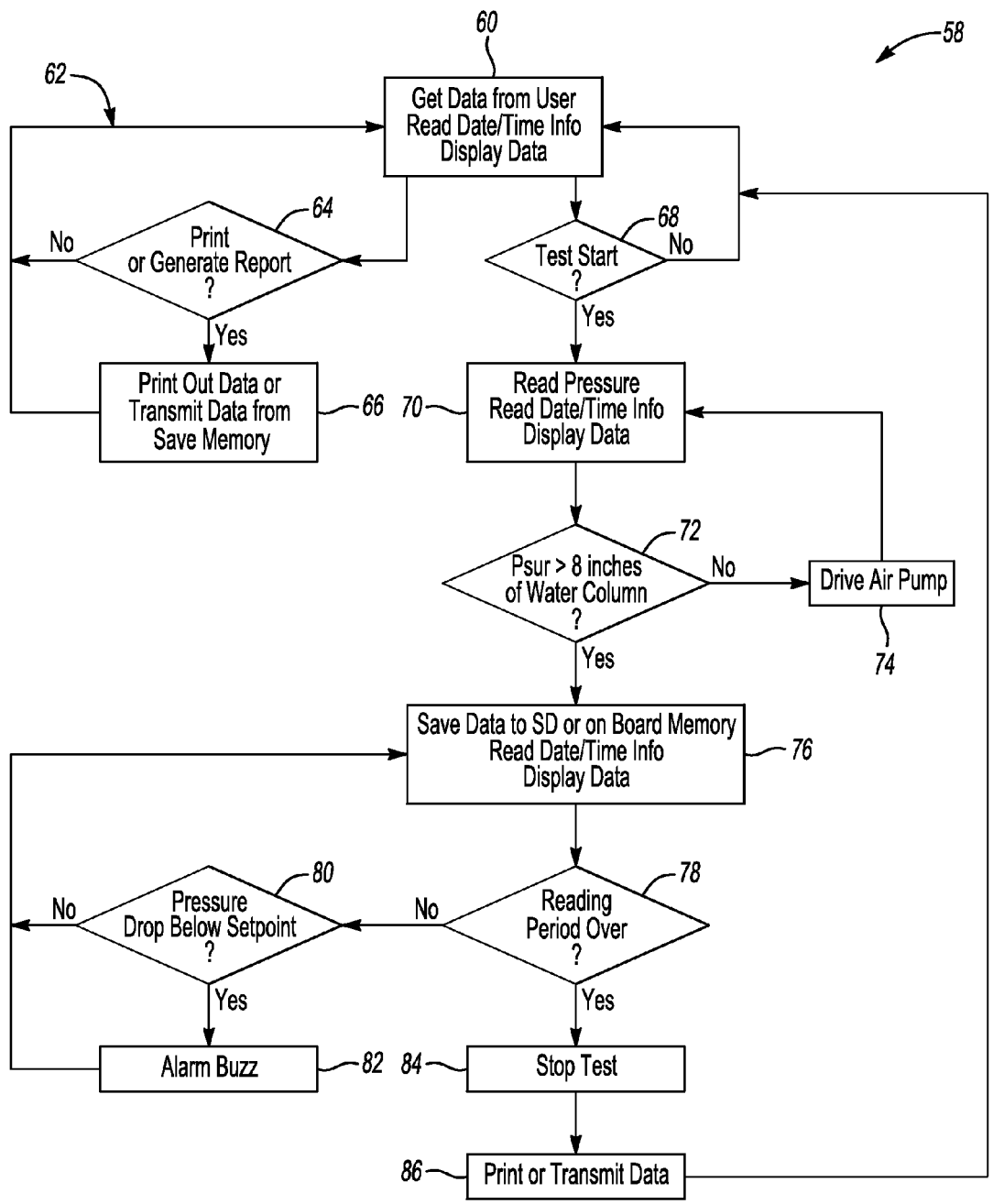
FIG. 3 is a flowchart illustrating a method in accordance with embodiments of the present invention.

FIG. 3 shows a flowchart 58 illustrating a method in accordance with an embodiment of the present invention. Such a method may be performed, for example, by the control system 28 shown in FIG. 2. The method starts at step 60, where data from an operator is entered, for example, through the keyboard 12 shown in FIG. 1. As described above, any number of different parameters or other information related to the test to be performed can be entered through the keyboard 12 by the operator. In addition to basic information such as the building address, other types of information that can be input—for example, the length of pipe in the piping system, the size of pipe, and the number of floors in the building where the piping system is being tested. This information can be used for, among other things, determining a volume of fluid that the piping system is expected to hold. In addition to receiving inputs from the operator, step 60 includes reading date and time information, which may be provided, for example, by a clock/timer or a wireless receiver, each of which may constitute one or more of the components 30-40 for the control system 28 as shown in FIG. 2. The display 14 can also be used to echo the inputs of the operator so that the operator can be confident that the information is correctly entered.

From step 60, a subroutine 62 may be performed, including a decision at decision block 64 as to whether a report should be printed or generated. This determination may be made based on whether, for example, an initial status report is required for the particular test being performed. If the answer is "Yes", a report is generated at step 66, and if not, the subroutine 62 returns to step 60. It is understood that the task of "generating a report" may include outputting data electronically to a storage device, transmitting it wirelessly to a server, or printing a hard copy on paper or some other medium. Although the subroutine 62 is discussed prior to the decision to start the test at decision block 68, it is understood that the steps described in the flowchart 58 do not necessarily occur in a chronological order as shown, but rather at least some of the steps may occur simultaneously with other steps or in a different order.

At decision block 68 it is determined whether or not to start the test. If the answer is "No", the method loops back to step 60, and if it is "Yes" the method moves to step 70. At step 70, the pressure of the piping system is read, for example, by the pressure sensor 26 shown in FIG. 2. The readings from the sensor 26 are output to the control system 28, which also may read date and time information, and display some or all of this data on the output display 14 shown in FIG. 1. For many buildings using natural gas to run standard appliances, the integrity test will be performed at a pressure of 6-8 inches of water column. This is a relatively low pressure, but may be greater than the pressure at which the system typically operates. In other environments, and other applications, much greater pressures may be necessary to adequately perform an integrity test. For example, if a piping system operates at a high pressure of 60 psi, a pump, such as the pump 24 shown in FIG. 2, may increase the pressure of the piping system to 90 psi or more for purposes of the test.

In the embodiment illustrated in the flowchart 58 in FIG. 3, a low pressure test is contemplated, so at decision block 72 a determination is made as to whether the pressure in the piping system has reached a predetermined pressure—i.e., is it greater than 8 inches of water column. Although the decision is shown as a determination of whether the pressure in the piping system is greater than the predetermined pressure, the decision may also be made as to whether it is at least as great as the predetermined pressure—i.e., is it greater than or equal to the predetermined pressure? If it is not, a pump, such as the pump 24, is operated as shown in step 74. The method loops back to step 70 where readings are taken again, data is displayed, and the decision regarding pressure is again performed at step 72.

Once the pressure reaches the level appropriate for the test being performed, the method moves to step 76. The determination of the pressure that is appropriate for the piping system being tested can be made by the operator in the field and input, for example, through the keyboard 12. Alternatively, the information may come from a central location that is provided via wireless communication to the testing system 10. In other embodiments, a control system such as the control system 28 may include a relatively large capacity electronic storage, and entry of building identification by an operator may allow the control system to output the appropriate parameters for the test, for example, by using a lookup table programmed into the electronic storage of the testing system.

At step 76, data regarding test performance and measurements are saved, for example to an SD card or onboard memory in the control system 28. Again, date and time information can be read from an internal clock/timer, and the data displayed on the output display 14. As described above, is important for the piping system to be pressurized to a certain testing pressure to ensure its integrity; however, it is often required that the predetermined pressure be maintained for a predetermined time to ensure that leaks are not present in the piping system. The predetermined time can be entered, for example, for each test by the operator through an input device such as the keyboard 12, or it may be part of the stored data accessed when the operator enters the building information. Alternatively, all of the test parameters may be transmitted wirelessly, or even through wired connections when the testing device 10 is at the utility or other central location. In fact, the testing parameters and building information for a given time period—e.g., a day or week of field use—can be stored in the testing system 10 to provide an operator all necessary or desirable information for tests at more than one location. This may be particularly useful in locations where wireless connections are poor or unavailable.

In the current example, which contemplates an integrity test of a low-pressure system commonly found in residential buildings, the predetermined time in which pressure must be held may be, for example, 5-10 minutes. At decision block 78 it is determined whether this predetermined time has elapsed, and if not, it is determined at decision block 80 whether the pressure in the piping system has dropped below the set point or predetermined pressure. If not, the method loops back to block 76 where the reading is again made at decision block 78. If the pressure has dropped below a set point when a determination is made at decision block 80, any number of actions may be taken, including an alarm indicator as shown in step 82.

As long as the predetermined time has not elapsed, the method will continue to loop so that it is repeatedly determined whether the pressure has dropped below the predetermined pressure—see decision block 80. If the pressure does not drop below the predetermined pressure throughout the predetermined time, the method moves from decision block 78 to step 84 where the test is terminated. At this point, any number of steps may be taken, for example, as shown in step 86, where the results of the test are printed or output via electronic transmission.

Although not shown in the flowchart 58, embodiments of the present invention may include certain volumetric calculations and measurements related to the piping system as discussed above. For example, a control system, such as the control system 28 may either be programmed with an expected volume of fluid the piping system can hold, or it may make such a calculation or determination based on inputs such as the total length of the piping, the piping diameter, etc. Then, the control system 28 can determine the volume of fluid actually in the piping system, for example, by receiving pressure inputs from the pressure sensor 26, and by knowing other parameters, such as the ambient temperature.

The control system 28 may also receive inputs from a flow meter 48 so that a volumetric flow of air from the pump 24 is known. The control system 28 can then compare the expected volume of fluid in the pipe to the determined (or estimated) volume, and it can then output data related to the compared volumes. This information can be useful because if the volume of fluid pumped into the piping system is significantly less than the expected volume, it may indicate a restriction in the piping system. Then, even though the piping system may not leak, it may still fail the test if it is determined that there is an unaccounted for blockage. Thus, embodiments of the present invention provide testing information that is either impractical or impracticable using known manual testing systems and methods.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A testing system for performing integrity testing in a gas piping system, comprising: a motorized pump for pressurizing the piping system; a pressure sensor for measuring the pressure in the piping system; an input device for receiving inputs from an operator related to a test to be performed; an output device for communicating information to the operator; a control system including at least one controller and configured to: control the pump to pressurize the piping system to a predetermined pressure, receive inputs from the pressure sensor, output data related to the pressure of the piping system; and a housing having a first chamber with the pump and control system disposed therein, and a second chamber fluidly isolated from the first chamber and having the pressure sensor disposed therein, the pressure sensor being connected to the control system through a sealed wall separating the first and second chambers.

2. The testing system of claim 1, wherein the control system is further configured to:
   monitor the pressure of the piping system for a predetermined time after the piping system is pressurized to the predetermined pressure, and
   output data related to: the pressure of the piping system over the predetermined time.

3. The testing system of claim 2, further comprising a flow meter in communication with the control system and configured to measure a volumetric flow of fluid leaking from the piping system during the predetermined time.

4. The testing system of claim 1, further comprising a check valve disposed between the pump and the pressure sensor to prevent fluid from the piping system from flowing back to the pump.

5. The testing system of claim 1, wherein the control system is further configured to:
   determine a volume of fluid in the piping system,
   compare the determined volume of fluid to an expected volume of fluid for the piping system, and
   output data related to the compared volumes.

6. A testing system for performing integrity testing in a gas piping system, comprising: a motorized pump for pressurizing the piping system; a pressure sensor for measuring the pressure in the piping system; a control system including at least one controller and configured to: control the pump to pressurize the piping system to a predetermined pressure, receive inputs from the pressure sensor, output data related to: the pressure of the piping system over a predetermined time; and a housing having first and second chambers fluidly isolated from each other, the pump and control system being disposed in one of the chambers and the pressure sensor being disposed in the other of the chambers and connected to the control system through a sealed wall.

7. The testing system of claim 6, further comprising a flow meter in communication with the control system and configured to measure a volumetric flow of fluid leaking from the piping system.

8. The testing system of claim 6, wherein the control system is further configured to store information related to tests to be performed at more than one location.

9. The testing system of claim 6, wherein the control system is further configured to:
   compare a determined volume of fluid to an expected volume of fluid for the piping system, and
   output data related to the compared volumes.

10. A method for performing integrity testing in a gas piping system, comprising:
    inputting data related to a test to be performed into a programmable testing system that includes: a motorized pump for pressurizing the piping system, a pressure sensor for measuring the pressure in the piping system, a control system and a housing having first and second chambers fluidly isolated from each other, the pump and control system being disposed in one of the chambers and the pressure sensor being disposed in the other of the chambers and connected to the control system through a sealed wall, the control system including at least one controller and being configured to: control the pump to pressurize the piping system to a predetermined pressure, receive inputs from the pressure sensor, and output data related to: the pressure of the piping system over a predetermined time;
    pressurizing the piping system to a predetermined pressure using the motorized pump;
    monitoring the pressure of the piping system after the piping system is pressurized to the predetermined pressure using the pressure sensor to provide outputs to the control system; and
    outputting data related to the pressure of the piping system from the control system.

11. The method of claim 10, wherein the step of monitoring the pressure of the piping system includes monitoring the pressure of the piping system for a predetermined time programmed into the control system after the piping system is pressurized to the predetermined pressure.

12. The method of claim 10, further comprising using the control system to:
    determine a volume of fluid in the piping system;
    compare the determined volume of fluid to an expected volume of fluid for the piping system; and
    output data related to the compared volumes.

13. The method of claim 10, further comprising using the control system to monitor a volumetric flow of fluid leaking from the piping system after the piping system is pressurized to the predetermined pressure.

14. The method of claim 10, wherein the step of outputting data related to the pressure of the piping system includes wirelessly transmitting the data to a receiving device.

\* \* \* \* \*